United States Patent
Kaupert

(10) Patent No.: US 6,741,363 B1
(45) Date of Patent: May 25, 2004

(54) METHOD AND AN APPARATUS FOR THE OPTICAL DETECTION OF A CONTRAST LINE

(75) Inventor: Bertram Kaupert, Oberaudorf (DE)

(73) Assignee: Steinbichler Optotechnik GmbH, Neubeuern (DE)

(*) Notice: Subject to any disclaimer, the term of this patent is extended or adjusted under 35 U.S.C. 154(b) by 0 days.

(21) Appl. No.: 09/453,515

(22) Filed: Dec. 1, 1999

(30) Foreign Application Priority Data

Dec. 1, 1998 (DE) .......................... 198 55 478

(51) Int. Cl.$^7$ .............................. G01B 11/24
(52) U.S. Cl. ............... 356/602; 356/623; 250/559.23; 250/559.31
(58) Field of Search ............... 356/375, 376, 356/373, 372, 384, 387, 445, 446, 601, 602, 606, 607, 608, 614, 622, 623; 250/559.23, 559.31

(56) References Cited

U.S. PATENT DOCUMENTS

| | | | | |
|---|---|---|---|---|
| 3,972,624 A | * | 8/1976 | Klein et al. ............ | 356/237 |
| 4,639,140 A | * | 1/1987 | Lerat .................... | 356/376 |
| 4,918,321 A | * | 4/1990 | Klenk et al. ............ | 356/445 |
| 5,129,010 A | * | 7/1992 | Higuchi et al. .......... | 382/8 |
| 5,291,270 A | * | 3/1994 | Koch et al. ............. | 356/375 |
| 5,311,289 A | * | 5/1994 | Yamaoka et al. ......... | 356/375 |
| 5,337,148 A | * | 8/1994 | Torii et al. ............ | 356/376 |
| 5,416,590 A | * | 5/1995 | Stover et al. ........... | 356/376 |
| 5,608,817 A | * | 3/1997 | Yamaoka et al. ......... | 356/375 |
| 5,870,199 A | * | 2/1999 | Wurbs et al. ........... | 356/376 |
| 5,923,427 A | * | 7/1999 | Dong .................... | 356/375 |
| RE36,560 E | * | 2/2000 | Svetkoff et al. ......... | 356/376 |

FOREIGN PATENT DOCUMENTS

| | | |
|---|---|---|
| DE | 4029339 | 3/1992 |
| DE | 19525987 | 1/1997 |

* cited by examiner

*Primary Examiner*—Hoa Q. Pham
(74) *Attorney, Agent, or Firm*—Dilworth & Barrese LLP.

(57) ABSTRACT

A method is provided for the optical detection of a contrast line in which the area or spatial coordinates of the contrast line are detected, with the detection being performed by a scanner, preferably a laser scanner, which scans the contrast line in a linear manner. An apparatus is also provided for the optical detection of a contrast line having a laser diode, a deflection apparatus for the deflection of the laser beam emitted from the laser diode and having a detector for the detection of the reflected beams, with the deflection apparatus being designed movably such that the laser beam emitted from the laser diode can be shifted in parallel by an amount depending upon position of the deflection apparatus and where the spatial coordinates of the contrast line can be detected by analyzing the beams detected by the detector. A numerically controlled machine is further provided, in particular a machine tool, a robot or a coordinate measuring machine, which possesses the apparatus for optically detecting a contrast line. A hand-held device is also provided which possesses the apparatus for optically detecting a contrast line.

33 Claims, 4 Drawing Sheets

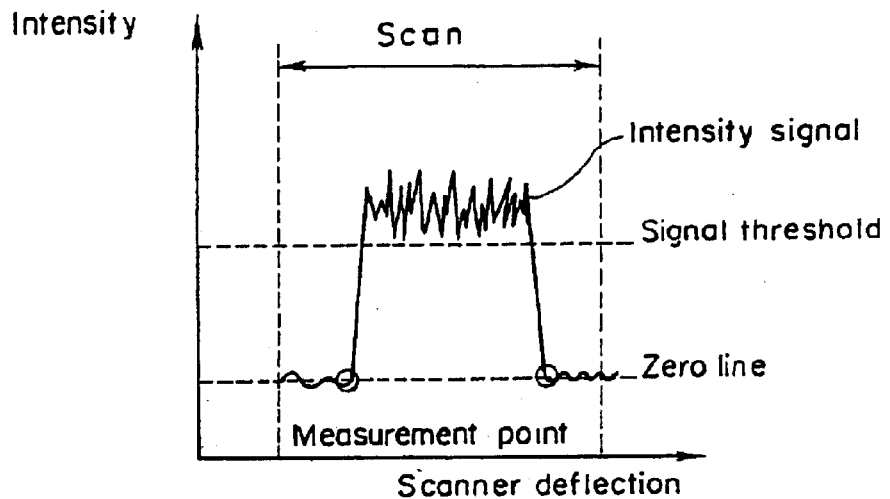
F I G. 4
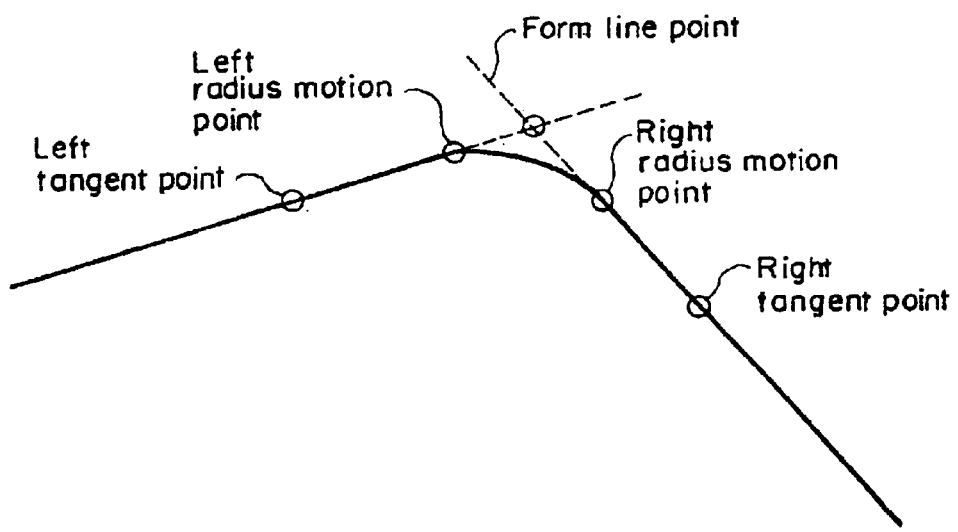
F I G. 5

METHOD AND AN APPARATUS FOR THE OPTICAL DETECTION OF A CONTRAST LINE

CROSS REFERENCE TO RELATED APPLICATIONS

This application claims priority under Title 35 of United States Code, §119 to Federal Republic of Germany Application No. 198 55 478.8 filed Dec. 1, 1998.

BACKGROUND OF THE INVENTION

The present invention relates to a method and an apparatus for the optical detection of a contrast line. The invention further relates to a numerically controlled machine, in particular a machine tool, a robot or a coordinate measuring machine, as well as to a hand-held device for the optical detection of a contrast line.

In known apparatuses for the optical detection of contrast lines, the measurement surface is scanned by a laser beam which is deflected, for example, by a swivellably or rotatably disposed, electrically controlled mirror. Depending on the mirror position, the laser beam reflected from the mirror is directed to the measurement surface in different directions. In such an apparatus, one disadvantage is that the angle of incidence of the laser beam hitting the measurement surface is not identical for all measurement points, but changes according to the disposition of the mirror. In this way, it becomes necessary to take the angle of incidence into account in the assessment.

An apparatus is known from DE-OS 40 29 339 A1 where the point light beam incident to the measurement surface is deflected in relation to the incident direction originally given by the beam source without the angle of incidence being changed thereby. In this known prior apparatus, the point light beam is subjected to a parallel shift within a deflection apparatus, but not to a change in the angle of incidence. Using such an apparatus, it is possible to inspect a plane measurement surface exactly, with the apparatus being moved over the measurement surface at an approximately constant distance.

BRIEF SUMMARY OF THE INVENTION

It is the object of the present invention to improve an apparatus and a method for the optical detection of a contrast line.

This object is solved by a method for the optical detection of a contrast line in which the area or spatial coordinates of the contrast line are detected, with the detection being performed by means of a scanner, preferably a laser scanner, which scans the contrast line in a linear manner. In such a coordinate measuring system, both the surfaces of a measurement object and characteristic lines on the measurement object can be detected in a non-contact manner in their area or spatial extension. The contrast lines can be, for example, construction lines or scribed lines, with both narrow lines, whose width is below the scan width of the apparatus in accordance with the invention, and wide lines or contrast differences being detectable. The contrast difference can also be formed by a change in the brightness of the contrast surface or also by color differences on the measurement surface. It is equally feasible for the contrast lines to be formed by contours or shape differences.

It is particularly advantageous if the detection of the contrast line is effected by means of a distance signal and/or by means of an intensity signal. During the digitizing of contrast lines, both the distance and the intensity signals are assessed. The distance signal serves to regulate the distance during the movement procedure and to compute the coordinates of the measurement point. Contrast transitions are detected using the intensity signal. The requirement for this is that the corresponding apparatus detector, which is preferably designed as an infrared detector, can distinguish the contrast difference. Changes in the intensity signal are produced, for example, by the transitions at surfaces of different colors and by light/dark or dark/light transitions, tapes stuck on materials such as plasticine and ureol or marks with an Edding color pen on paper.

In a further aspect of the present invention, it is provided that the scan line of the scanner or the laser scanner is aligned perpendicularly to the contrast line.

Here, the scan line can be tracked in such a way that it is always perpendicular to the contrast line even when the latter is curved, with the tracking preferably being effected by the rotation of the measurement head of the scanner or laser scanner.

In another aspect of the present invention, it is provided that the detection of the contrast line is performed by the intensity of the beam emitted by the scanner or laser scanner being controlled in such a way that the intensity of the reflected beam on the detector of the scanner or laser scanner always assumes a constant value, with the intensity of the emitted beam serving as a measurement value for the detection of the contrast line.

The intensity signal is taken, for example, from the intensity control circuit of the laser electronics, which intensity control circuit ensures that the laser, advantageously designed as a triangulation laser, provides a constant distance signal in wide areas despite the changing material finish of the surface to be inspected and despite the changing reflection angle of the laser beam in relation to the surface. High intensities suggest poor reflectance, low intensities good reflectance.

It is particularly advantageous if the number of linear scans (scan lines) increases as the radius of curvature of the contrast line decreases. In this way, it becomes possible to provide a number of measurement points with small radii of curvature in order to detect the profile correspondingly precisely. Thus, the measurement apparatus is reduced correspondingly in speed on tight radii of curvature, which allows the detection of more measurement points in these regions.

The present invention further relates to an apparatus for the optical detection of a contrast line having a radiation source, preferably a light source for coherent radiation, preferably a laser diode, a deflection apparatus for the deflection of the beam emitted from the radiation source and a detector for the detection of the reflected beams, with the deflection apparatus being designed in such a way that the beam emitted from the radiation source or the laser diode can be displaced, preferably displaced in parallel and with the area or spatial coordinates of the contrast line being detectable by means of the beams detected by the detector.

It is particularly advantageous if the radiation source or the laser diode, the deflection apparatus and the detector are disposed in a measurement head. The apparatus or the measurement head can be designed rotatably around the axis of the beam emitted from the radiation source or the laser diode. The measurement head can be designed in such a way that it can be disposed on a machine tool or coordinate measuring machine or any other robot. If the line to be examined or detected possesses a curved course, the apparatus or the measurement head can be guided using the axis of rotation in such a way that its longitudinal axis is always aligned in parallel to the tangent on the line at the point measured. In this state, the scan line is aligned perpendicularly to the contrast line to be examined.

It is particularly advantageous if the detector is designed as a line sensor. It is also feasible for an area sensor to be used. The sensor in accordance with the invention is advantageously designed as a position sensitive detector (PSD) or a charge coupled device (CCD).

In accordance with a preferred embodiment of the present invention, a control unit is provided by means of which the intensity of the beam emitted from the radiation source or the laser diode can be modified in such a way that the intensity of the beam detected by the detector always assumes a constant value.

In a further aspect of the present invention, it is provided that the deflection apparatus is defined in such a way that the scan width is 10 to 12 mm.

It is particularly advantageous if the deflection apparatus is designed as a rotating prism. In this way, it is achieved that depending on the rotation position of the prism, a deflection of the beams is effected without this changing the incident direction. By means of such a rotating prism it is possible to perform a linear scanning of the contrast line. Instead of a prism, it is equally feasible to use any other deflection apparatuses by means of which a linear scan is possible. A swivellable mirror can also be used.

The present invention further relates to a numerically controlled machine, particularly a machine tool, a robot or a coordinate measuring machine, which possesses an apparatus for the optical detection of a contrast line. Such NC machines usually possess three linear and two rotational axes (horizontal arm or portal). By means of the preferably provided rotational facility of the measurement head or the apparatus in accordance with the invention around the axis of the beam emitted from the radiation source, another rotational axis is created which allows the apparatus to be aligned always in the desired manner over the contrast line.

The present invention further relates to a hand-held device for the optical detection of a contrast line which possesses an apparatus. Here, it is advantageous to provide a detection device by means of which the position of the hand-held device can be detected exactly. Here, the hand-held device can possess a plurality of light sources whose positions can be detected using corresponding detection devices. With such a hand-held device; the position of the contrast line relative to the hand-held device can be detected by means of the apparatus in accordance with the invention and the position of the hand-held device relative to a position detection device can be detected by means of a corresponding position detection device. By the combination of both measurement results, the area or spatial structure of the contrast line can be determined.

BRIEF DESCRIPTION OF THE DRAWINGS

Further advantages and details of the present invention are explained in more detail by means of an embodiment shown in the drawing.

FIG. 4 shows the contrast recognition with a tape;

FIG. 5 shows the computation of a form line point by means of a tangential section;

DESCRIPTION OF THE PREFERRED EMBODIMENTS

Figure 1:
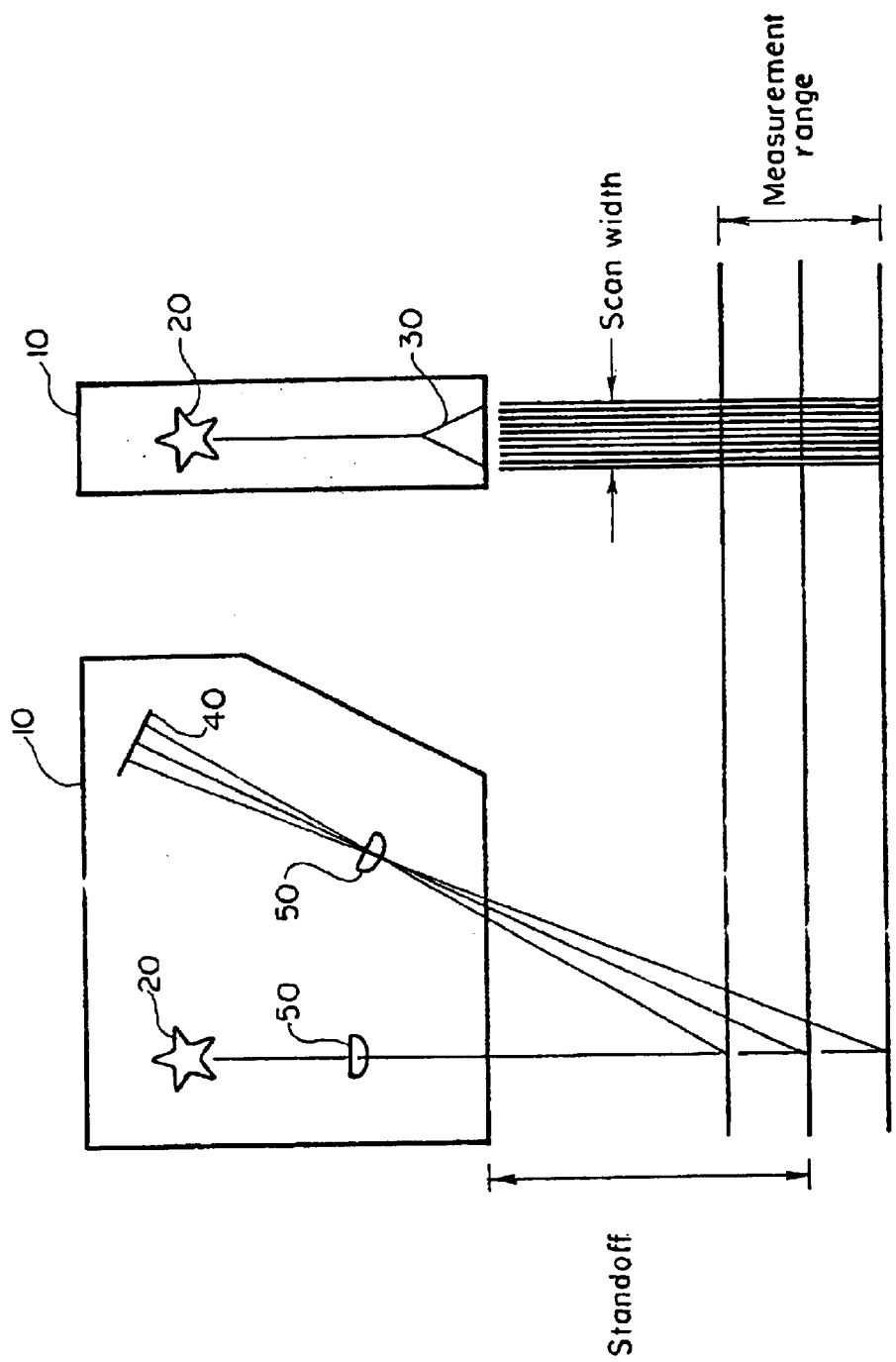
FIG. 1 shows the functional principle of the laser scanner.

FIG. 1 shows the apparatus in accordance with the invention for the optical detection of a contrast line which is designed as a measurement head 10. The measurement head 10 is shown in FIG. 1, left, in a schematic side view and in FIG. 1, right, in a schematic front view.

The measurement head 10 possesses the laser diode 20, the deflection apparatus 30 and the detector 40 which is designed as a PSD (position sensitive detector). Optical devices 50 for the deflection of the beams are disposed in the beam path of the laser beam emitted from the laser diode 20 and of the beam reflected from the surface of a workpiece.

The deflection apparatus 30 is designed as a rotating prism which is located both in the emitted and the reflected beam.

The measurement head 10 can be rotated around an axis which is congruent to the laser beam emitted from the laser diode 20 and shown in FIG. 1.

The intensity of the beam emitted from the laser diode 20 is regulated by means of a regulating unit (not shown) in such a way that the intensity of the beam detected on the detector 40 assumes a constant value independently of the surface finish of the surface under examination. It results from this that high intensities of the laser diode 20 indicate poor reflectance, low intensities good reflectance.

The laser (designed as a triangulation laser) of the measurement head 10 supplies two different measurement signals to the controller of the system: one distance signal which gives the distance (stand-off) of the detector 40 to the surface of the workpiece, and one intensity signal which represents a measure for the degree of reflectance of the surface material to be measured.

The laser beam from the laser diode 20 is shifted in parallel by means of the rotating prism by an amount dependent on the rotational position of the prism, by means of which the scan width shown in FIG. 1, right, is produced. If the laser beam entering or exiting the prism is perpendicularly incident to the relevant surface of the prism, no deflection occurs. In all other positions, the laser beam is transposed in parallel. The beams reflected from the surface are detected by the detector 40. The measurement range of the detector 40 is indicated by the upper and lower reflected beams shown in FIG. 1, left.

If the laser scanner is positioned on the contrast transition, the exact position of the transition relative to a defined coordinate system can be determined using the scan function. A second position at a low distance from the first provides the direction of extension of the line under observation. If the sensor is moved along the line, a number of measurement points in a row are produced which reproduce the spatial position of the line. Every contrast transition supplies its own measurement point so that the result consists of one or two poly-lines, depending on whether a color border or a tape was detected. If the line has a curved course, the measurement head 10 of the laser scanner can be adjusted using the axis of rotation so that its longitudinal axis is always aligned in parallel with the tangent on the line at the point measured.

To detect the contrast line, it is necessary that the contrast line is first detected in a search and centration process and that the alignment of the measurement head 10 is determined and then the data detected digitized.

The digitizing of a contrast line is preceded first by a search and centration process in which the two-dimensional working range of the laser scanner is centered on the center of the line and aligned in parallel to its course. For this purpose, the start position, the number of contrast transitions (one or two), the search speed, the direction of digitization of the laser scanner, the search direction, the maximum search path and the orientation of the sensor have to be fixed by the user.

The measurement head 10 is first set to a defined start position in the "surrounding material" and then moved in the fixed direction ("to the left" or "to the right"—relative to the measurement head longitudinal axis) in the direction of the contrast line with the laser switched on. The intensity of the "surrounding material" at the start position provides the "zero line" from which the contrast differences can be computed.

Depending on whether a change is effected on the line from light to dark or dark to light material, the system determines different given values for the following digitization. The measurement point(s) are always determined on the "surrounding material" directly next to the contrast transition. During the search process, the laser scanner follows the surface contour, i.e., the distance to the surface is continually regulated at constant using the distance signal measured. If no exceeding of the intensity signal threshold is discovered after the given maximum search path, the system searches in the opposite direction with the measurement head 10 turned through 180°. If the start position is reached without a contrast signal, the search process is finally aborted.

Figure 2:
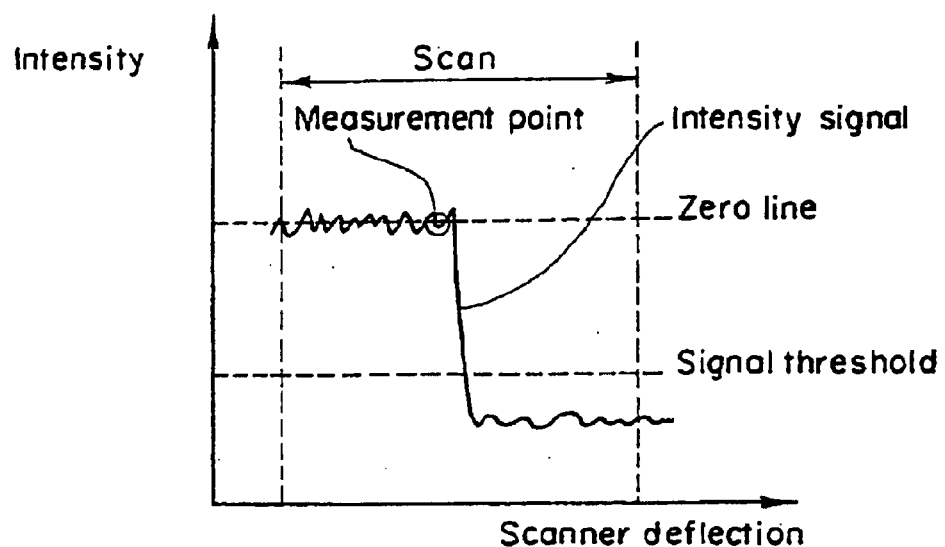
FIG. 2 shows the contrast recognition at a dark/light transition.
Figure 3:
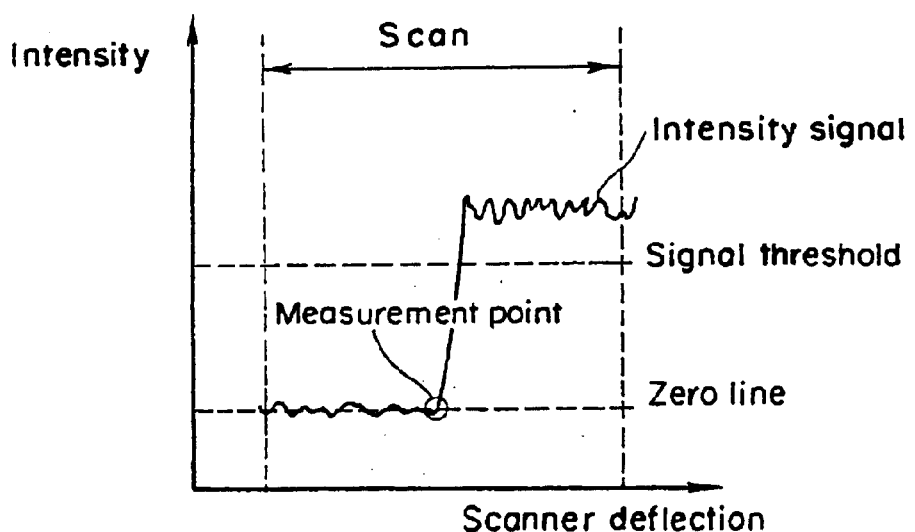
FIG. 3 shows the contrast recognition at a light/dark transition.

FIG. 2 shows the intensity curve of the laser diode 20 at the transition dark/light and FIG. 3 at the transition light/dark. If the apparatus in accordance with the invention detects a tape, the intensity curve seen in FIG. 4 is produced applied over the scanner deflection. Here, two transitions are produced in accordance with the width of the tapes. In FIGS. 2 to 4, the intensities are applied over the deflection of the scanner.

If the intensity contrast exceeds the selectable threshold value (signal threshold) within the current scan, centration begins. The measurement head 10 is aligned here so that the contrast transition or with the tape the center between the left and right contrast transition are located in the scan center.

The coordinates of the first measurement point are temporarily stored and the measurement head 10 is displaced by a few millimeters against the search direction and in the digitization direction in order to determine the orientation of the line in the projection plane for traveling in the later digitization. At this point, a second measurement point is detected by means of a new search and centration process. The angle of the rotational axis searched for is then calculated by using the following formula:

$$\delta = \arctan\left[\frac{-d^T y}{d^T x}\right]$$

where $\delta$: angle of rotational axis
$d^T_{x,y}$: movement vector, transformed into the measurement head system
The movement vector is calculated as follows:

$d_x = q_x - p_x$
$d_y = q_y - p_y$
$d_z = q_z - p_z$
where $d_{x,y,z}$: movement vector
$p_{x,y,z}$: first measurement point on the line
$q_{x,y,z}$: second measurement point on the line Finally, the measurement head 10 is positioned parallel to the line by rotating the rotational axis and positioned back on the first support point.

When digitizing a contrast line, the laser scanner follows its course until either the working range of the coordinate measuring machine or a range set by the operator is left, the line memory is completely full or (e.g., at the line end) a given signal threshold is no longer reached. For this purpose, the digitizing speed, the type of filtering, the digitizing direction and the flag for the head rotation must be given by the user.

The laser scanner is accelerated to digitizing speed in the direction given and automatically follows the contour course, i.e., the distance to the surface is continually regulated at constant using the distance signal measured. The computer constantly determines the current deviation of the center of the scan range from the center of the line. This deviation, together with the current direction of movement, allows the computation of the new components of the speed vector and so the correct driving of the measurement unit.

The components of the speed vector of the laser projection plane (x and y measurement heads) are computed at fixed time intervals using the following formulas:

$$v_x = \frac{s_x \cdot v_x + s_y \cdot d \cdot p_v \cdot v_d}{sl}$$

$$v_y = \frac{s_x \cdot v_x + s_y \cdot d \cdot p_v \cdot v_d}{sl}$$

where $v_{x,y}$: speed to be output
$s_{x,y}$: speed sum vector
$v_x$: current speed
$v_d$: max. digitizing speed
d: determined deviation from the line
$p_v$: factor for the regulation amplification
sl: length of the sum vector The speed in the laser direction (z measurement head) is calculated using the following formula:

$$v_z = \left[\frac{d_L}{2} - d\right] p_d$$

where $v_z$: z component of the speed to be output
$d_L$: laser measurement range
d: measured distance value
$p_d$: regulation amplification The rotational axis is aligned parallel to the line using the following method:

$$v_{dax} = \left[\arctan\left[\frac{-d_y}{d_x}\right] - \delta\right] p_{dax}$$

where $v_{dax}$: speed of the rotational axis
$d_{x,y}$: direction vector
$\delta$: current angle of the rotational axis
$p_{dax}$: regulation amplification A positive digitizing direction ('+') effects a movement with the front side of the laser scanner forward, a negative direction ('−') accordingly with the rear side forward. If both directions are given, digitization is performed—beginning from the start point—both forward and backward after each other, and the results are put together to form one line in the computer. By using the head rotation, a continuation of the digitization can be effected under unfavorable reflection conditions with a measurement head 10 rotated through 180°. This applies both to the forwards and the backwards movement so that the digitization result can be made up of up to four parts. If a filter setting was selected, the measurement data obtained are smoothed prior to data saving.

If the laser scanner loses contact to the surface, i.e., if the measurement range of the laser is left, the coordinate measuring machine stops and the running digitization process is aborted. Abortion also occurs if the given signal threshold is no longer reached.

Another application area of the apparatuses in accordance with the invention is produced from a method known from DE-OS 195 25 987 A1. Here, the scanning device is moved at least approximately perpendicularly with relation to the course of a spatial contour over the same and the coordinates of a sequence of points (left and right tangent points, left and right radius travel points) are determined which are also in the surfaces neighboring the spatial contour. Subsequently, the associated spatial point (form line point) is determined from the tangent section. Such spatial profiles occur, for example, at character lines of vehicles. Here, for example, the roof-shaped measurement profile seen in FIG. 5 is produced. Parallel to the first scanning plane, the spatial contour is scanned along a second scanning plane and here the associated spatial point fixed by a tangent section. In the direction determined by the two spatial points, another scanning is performed perpendicularly to this direction, with the apparatus in accordance with the invention constantly computing the deviation of the determined line point from the scan center and using this information to control the measurement unit in order to follow the line curve.

Figure 6:
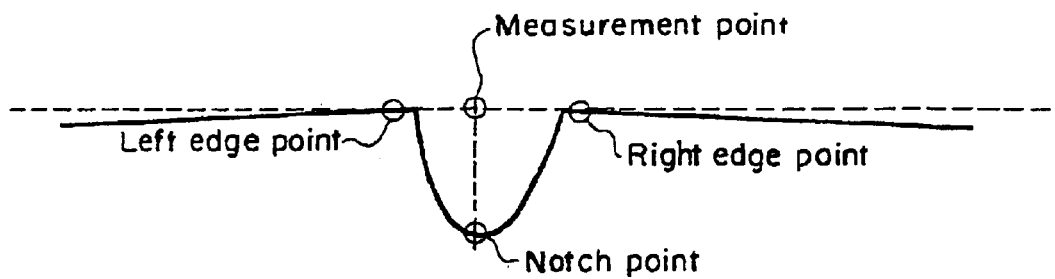
FIG. 6 shows the detection of a scribed line.

A possible application for the apparatuses and the method in accordance with the invention beyond this is that of so-called scribed lines. Scribed lines are inscribed or cut into the surface of the measurement object using a marking-out tool or similar. The characteristic measurement profile is essentially different to the characteristic line (see FIG. 6). The measurement point is located on a connecting line between two points on the surface of the measurement object directly to the left or right of the inscription. A line perpendicular to the connecting line through the point in the center of the notch clearly determines the measurement point. The two edge points and the point in the notch can be determined, for example, by numeric derivation of the measured cross-section profile. The described detection of the inscribed lines is interesting, for example, in model construction where inscribed lines disposed in the model have to be digitized with the least possible effort and simultaneously high precision.

Figure 7:
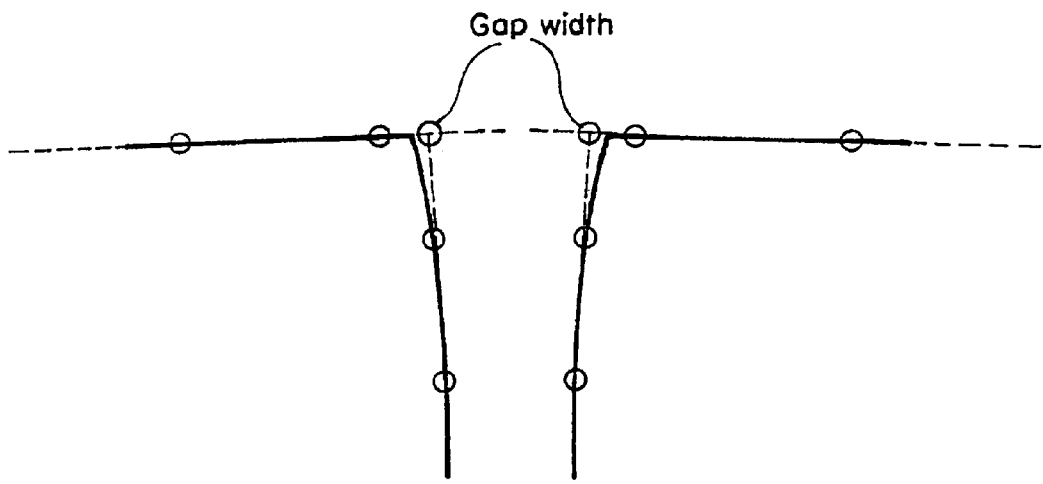
FIG. 7 shows the detection of a door gap.

Further application possibilities are given in the field of gap measurement. In the automobile sector, the width of door, hatchback or front opening gaps can only be determined with great effort and mostly using mechanical methods. The typical measurement profile of such a gap requires in turn a specially adapted evaluation method (see FIG. 7).

The method and the apparatuses in accordance with the invention for the automatic tracing of the lines, for distance regulation and for the tracking of the rotational axes are used both for inscribed lines and in gap measurement. The methods described differ merely by the manner of evaluation of the measurement profile.

What is claimed is:

1. A method for the optical detection of a contrast line, the method comprising the steps of:

scanning a reflective surface having at least one contrast line thereon with radiation emitted from at least one source of emitted radiation;

detecting at least one reflected radiation signal;

detecting a change in intensity of the reflected radiation signal to determine that a contrast line has been detected;

controlling the intensity of the emitted radiation beam so that the intensity of said detected radiation signal is maintained at a constant intensity; and measuring distance at the point of the reflective surface of the detected change in intensity of the reflected radiation signal between the reflective surface and a detector by a triangulation method.

2. The method of claim 1 wherein the step of controlling the intensity of the emitted radiation serves as a measurement value for the detection of the contrast line.

3. The method of claim 1 further comprising the step of determining a change in said detected signal.

4. The method of claim 1 further comprising the step of determining a contrast transition in a coordinate wherein said coordinate is selected from the group consisting of area coordinates and spatial coordinates.

5. The method of claim 4 wherein the step of determining a contrast transition comprises determining a contrast transition selected from the group of consisting of color border contrast transitions, dark/light contrast transitions, light/dark contrast transitions, tape contrast transitions, and combinations thereof.

6. The method of claim 1 wherein the step of scanning comprises scanning a reflective surface selected from the group consisting of plane measurement reflective surfaces, contour measurement reflective surfaces, and combinations thereof.

7. The method of claim 6 wherein the step of scanning further comprises repeating the scanning in inverse proportion to the radius of curvature of said contour measurement reflective surface.

8. The method of claim 1 wherein the step of detecting a signal comprises detecting a signal selected from the group consisting of distance signals, intensity signals, and combinations thereof.

9. The method of claim 1 wherein the step of scanning comprises perpendicularly scanning said reflective surface.

10. The method of claim 1 wherein the step of scanning comprises scanning in a linear manner.

11. The method of claim 1 wherein the step of detecting is performed with a laser scanner.

12. The method of claim 11 wherein the step of detecting is carried out by tracking a scan line such that the scan line always remains perpendicular to a contrast line, even when the contrast line is curved, and with the tracking being performed by rotating a measuring head (10) of the laser scanner.

13. The method of claim 1, comprising the additional step of controlling the detecting of a contrast line effected by intensity of an emitted beam, such that intensity of the beam reflected onto a detector (40) of a scanner always assumes a constant value, with intensity of an emitted beam serving as a measuring value for detecting the contrast line.

14. An apparatus for the optical detection of a contrast line on a reflective surface, said apparatus comprising:

at least one source of emitted radiation;

means for deflecting said emitted radiation;

at least one means for detecting reflected emitted radiation;

means for detecting a change in intensity of the reflected radiation signal to determine that a contrast line has been detected;

means for regulating the intensity of the emitted radiation so that the intensity of the detected radiation is maintained at a constant intensity; and means for measuring distance at the point of the reflective surface of the detected change in intensity of the reflected radiation signal between the reflective surface and a detector by a triangulation method.

15. The apparatus of claim 14 wherein the intensity of the emitted radiation serves as a measurement value for the detection of the contrast line.

16. The apparatus of claim 14 further comprising a measurement head (10) in which said source (20) which is a laser diode, deflecting means (30) and detecting means (40) are disposed.

17. The apparatus of claim 16 wherein the measurement head contains said source of emitted radiation, said means for deflecting emitted radiation, and said means for detecting reflected emitted radiation.

18. The apparatus of claim 14 wherein said means for detecting reflected radiation is selected from the group consisting of infrared detectors, line sensor detectors, area sensor detectors, position sensitive detectors and charge coupled devices.

19. The apparatus of claim 14 wherein said means for deflecting emitted radiation is selected from the group consisting of rotating prisms and swivellable mirrors.

20. The apparatus of claim 14 comprising means for rotating around the axis of the emitted radiation.

21. The apparatus of claim 14 further comprising means for numerical control of a machine.

22. The apparatus of claim 21 wherein the machine is selected from the group consisting of machine tools, robots, and coordinate measuring machines.

23. The apparatus of claim 14 wherein said deflective means (30) are structured and arranged such that a beam emitted from said source (20) which is a laser diode is shiftable in parallel with area or spatial coordinates of a contrast line being detectable by said detecting means (40).

24. The apparatus of claim 14 which is structured and arranged to be rotatable around an axis of a beam emitted by said source (20).

25. The apparatus of claim 14 wherein said deflecting means is structured and arranged to provide a scanning width of 10 to 12 mm.

26. A hand-held device for the optical detection of a contrast line on a reflective surface, said hand-held device comprising:

at least one source of emitted radiation;

means for deflecting said emitted radiation;

at least one means for detecting reflected emitted radiation;

means for detecting a change in intensity of the reflected radiation signal to determine that a contrast line has been detected;

means for regulating the intensity of the emitted radiation so that the intensity of the detected radiation is maintained at a constant intensity; and means for measuring distance at the point of the reflective surface of the detected change in intensity of the reflected radiation signal between the reflective surface and a detector by a triangulation method, said device being structured and arranged to be held by hand.

27. The hand-held device of claim 26 wherein the intensity of the emitted radiation serves as a measurement value for the detection of the contrast line.

28. A method for the optical detection of a contrast line, comprising the steps of:

scanning a reflective surface having at least one contrast line thereon with radiation emitted from at least one source of emitted radiation;

detecting at least one reflected radiation signal;

controlling the intensity of the emitted radiation beam so that the intensity of said detected radiation signal is maintained at a constant intensity;

measuring distance between the reflective surface and a detector by a triangulation method; and positioning at least one source of radiation parallel to the contrast line by determining an angle of rotational axis, said angle of rotational axis determined by the formula $$\delta = \arctan\left[\frac{-d^T y}{d^T x}\right]$$

where $\delta$ is the angle of rotational axis, and $d^T_{x,y}$ is a movement vector determined by $$d_x = q_x - p_x$$
$$d_y = q_y - p_y$$
$$d_z = q_z - p_z$$

where $d_{x,y,z}$ is a movement vector, $p_{x,y,z}$ is a first measurement point on the contrast line, and $q_{x,y,z}$ is a second measurement point on the contrast line.

29. The method of claim 28, comprising the additional steps of digitizing a contrast line by the steps of, (a) determining a speed vector in the laser projection plane of the at least one source of radiation by the formulas $$v_x = \frac{s_x \cdot v_x + s_y \cdot d \cdot p_v \cdot v_d}{sl}$$

$$v_y = \frac{s_x \cdot v_x + s_y \cdot d \cdot p_v \cdot v_d}{sl}$$

where $v_{x,y}$ is speed to be output, $s_{x,y}$ is speed sum vector, $v_x$ is current speed, $v_d$ is maximum digitizing speed, d is determined deviation from the line, $p_v$ is a factor for the regulation amplification, and sl is length of the sum vector;

(b) determining a speed vector in the laser direction by the formula $$v_z = \left[\frac{d_L}{2} - d\right] p_d$$

where $v_z$ is the z component of speed to be output, $d_L$ is laser measurement range, d is measured distance value, and $p_d$ is regulation amplification; and (c) determining rotational axis by the formula $$v_{dax} = \left[\arctan\left[\frac{-d_y}{d_x}\right] - \delta\right] p_{dax}$$

where $v_{dax}$ is speed of the rotational axis, $d_{x,y}$ is a direction vector, $\delta$ is a current angle of the rotational axis, and $p_{dax}$ is regulation amplification.

30. An apparatus for the optical detection of a contrast line on a reflective surface, comprising:
   at least one source of emitted radiation;
   means for deflecting said emitted radiation;
   at least one means for detecting reflected emitted radiation;
   means for regulating the intensity of the emitted radiation so that the intensity of the detected radiation is maintained at a constant intensity; and
   means for measuring distance between the reflective surface and a detector by a triangulation method,
   wherein the at least one source of emitted radiation is positioned parallel to the contrast line by determining an angle of rotational axis by the formula $$\delta = \arctan\left[\frac{-d^T y}{d^T x}\right]$$

where $\delta$ is the angle of rotational axis, and $d^T_{x,y}$ is a movement vector determined by $d_x = q_x - p_x$
$d_y = q_y - p_y$
$d_z = q_z - p_z$ where $d_{x,y,z}$ is a movement vector, $p_{x,y,z}$ is a first measurement point on the contrast line, and $q_{x,y,z}$ is a second measurement point on the contrast line.

31. The apparatus of claim 30, additionally comprising means for determining during a digitizing mode,
   (a) a speed vector in the laser projection plane of the at least one source of emitted radiation by the formulas $$v_x = \frac{s_x \cdot v_x + s_y \cdot d \cdot p_v \cdot v_d}{sl}$$

$$v_y = \frac{s_x \cdot v_x + s_y \cdot d \cdot p_v \cdot v_d}{sl}$$

where $v_{x,y}$ is speed to be output, $s_{x,y}$ is speed sum vector, $v_x$ is current speed, $v_d$ is maximum digitizing speed, d is determined deviation from the line, $p_v$ is a factor for the regulation amplification, and sl is length of the sum vector;
   (b) a speed vector in the laser direction by the formula $$v_z = \left[\frac{d_L}{2} - d\right] p_d$$

where $v_z$ is the z component of speed to be output, $d_L$ is laser measurement range, d is measured distance value, and $p_d$ is regulation amplification; and
   (c) rotational axis by the formula $$v_{dax} = \left[\arctan\left[\frac{-d_y}{d_x}\right] - \delta\right] p_{dax}$$

where $v_{dax}$ is speed of the rotational axis, $d_{x,y}$ is a direction vector, $\delta$ is current angle of the rotational axis, and $p_{dax}$ is regulation amplification.

32. A hand-held device for the optical detection of a contrast line on a reflective surface, said hand-held device comprising:
   at least one source of emitted radiation;
   means for deflecting said emitted radiation;
   at least one means for detecting reflected emitted radiation;
   means for regulating the intensity of the emitted radiation so that the intensity of the detected radiation is maintained at a constant intensity; and
   means for measuring distance between the reflective surface and a detector by a triangulation method,
   said device being structured and arranged to be held by hand,
   wherein the at least one source of emitted radiation is positioned parallel to the contrast line by determining an angle of rotational axis by the formula $$\delta = \arctan\left[\frac{-d^T y}{d^T x}\right]$$

where $\delta$ is the angle of rotational axis, and $d^T_{x,y}$ is a movement vector determined by $d_x = q_x - p_x$
$d_y = q_y - p_y$
$d_z = q_z - p_z$ where $d_{x,y,z}$ is a movement vector, $p_{x,y,z}$ is a first measurement point on the contrast line, and $q_{x,y,z}$ is a second measurement point on the contrast line.

33. The apparatus of claim 32, additionally comprising means for determining, during a digitizing mode,
   (a) a speed vector in the laser projection plane of the at least one source of emitted radiation by the formulas $$v_x = \frac{s_x \cdot v_x + s_y \cdot d \cdot p_v \cdot v_d}{sl}$$

$$v_y = \frac{s_x \cdot v_x + s_y \cdot d \cdot p_v \cdot v_d}{sl}$$

where $v_{x,y}$ is speed to be output, $s_{x,y}$ is speed sum vector, $v_x$ is current speed, $v_d$ is maximum digitizing speed, d is determined deviation from the line, $p_v$ is a factor for the regulation amplification, and sl is length of the sum vector;
   (b) a speed vector in the laser direction by the formula $$v_z = \left[\frac{d_L}{2} - d\right] p_d$$

where $v_z$ is the z component of speed to be output, $d_L$ is laser measurement range, d is measured distance value, and $p_d$ is regulation amplification; and
   (c) rotational axis by the formula $$v_{dax} = \left[\arctan\left[\frac{-d_y}{d_x}\right] - \delta\right] p_{dax}$$

where $v_{dax}$ is speed of the rotational axis, $d_{x,y}$ is a direction vector, $\delta$ is current angle of the rotational axis, and $p_{dax}$ is regulation amplification.

* * * * *